United States Patent
Honjo et al.

(10) Patent No.: US 11,242,919 B2
(45) Date of Patent: Feb. 8, 2022

(54) DIAGNOSIS SYSTEM FOR BALL SCREW UNIT AND MOTOR CONTROL SYSTEM

(71) Applicants: THK CO., LTD., Tokyo (JP); DISCO Corporation, Tokyo (JP)

(72) Inventors: Yoshiyuki Honjo, Tokyo (JP); Shuhei Yamanaka, Tokyo (JP); Katsuya Iida, Tokyo (JP); Satoshi Takahashi, Tokyo (JP)

(73) Assignees: THK CO., LTD., Tokyo (JP); DISCO CORPORATION, Tokyo (JP)

( * ) Notice: Subject to any disclaimer, the term of this patent is extended or adjusted under 35 U.S.C. 154(b) by 0 days.

(21) Appl. No.: 16/771,016

(22) PCT Filed: Dec. 11, 2018

(86) PCT No.: PCT/JP2018/045529
§ 371 (c)(1),
(2) Date: Jun. 9, 2020

(87) PCT Pub. No.: WO2019/117152
PCT Pub. Date: Jun. 20, 2019

(65) Prior Publication Data
US 2021/0164546 A1    Jun. 3, 2021

(30) Foreign Application Priority Data
Dec. 13, 2017  (JP) .............................. JP2017-238757

(51) Int. Cl.
*F16H 25/20*  (2006.01)
*F16H 25/22*  (2006.01)
(Continued)

(52) U.S. Cl.
CPC ......... *F16H 25/2214* (2013.01); *F16H 25/24* (2013.01); *F16H 2025/2075* (2013.01); *H02P 29/024* (2013.01)

(58) Field of Classification Search
CPC ................. F16H 25/2214; F16H 25/24; F16H 2025/2075; H02P 29/024
See application file for complete search history.

(56) References Cited

U.S. PATENT DOCUMENTS

| | | | |
|---|---|---|---|
| 6,570,282 B1 * | 5/2003 | Ito | F16H 25/2204 310/75 R |
| 2010/0109588 A1 * | 5/2010 | Koike | B62D 5/046 318/400.21 |

(Continued)

FOREIGN PATENT DOCUMENTS

| | | |
|---|---|---|
| JP | 2010-149770 A | 7/2010 |
| JP | 2016-34224 A | 3/2016 |
| JP | 2017-53431 A | 3/2017 |

OTHER PUBLICATIONS

International Search Report dated Feb. 26, 2019, issued in counterpart application No. PCT/JP2018/045529, w/English translation (2 pages).

*Primary Examiner* — Zakaria Elahmadi
(74) *Attorney, Agent, or Firm* — Westerman, Hattori, Daniels & Adrian, LLP

(57) ABSTRACT

An object of the present invention is to preferably detect the failure accompanied with the decrease in the pre-load in a ball screw unit. The failure diagnosis is performed for the ball screw unit on the basis of a combination of a resonance frequency in an axial direction of a predetermined machine assembly including the ball screw unit and a motor and a position of a nut member on a screw shaft corresponding to the resonance frequency as provided when the screw shaft is driven and rotated by the motor.

5 Claims, 4 Drawing Sheets

(51) Int. Cl.
*F16H 25/24* (2006.01)
*H02P 29/024* (2016.01)

(56) References Cited

U.S. PATENT DOCUMENTS

| | | | |
|---|---|---|---|
| 2015/0147007 A1* | 5/2015 | Huag | G01P 3/488 |
| | | | 384/8 |
| 2015/0226311 A1* | 8/2015 | Lee | F16H 25/2214 |
| | | | 74/424.86 |
| 2016/0033959 A1 | 2/2016 | Iijima et al. | |
| 2018/0156293 A1* | 6/2018 | Fox | F16F 7/1022 |
| 2019/0048988 A1* | 2/2019 | Besser | H02K 11/35 |
| 2019/0054952 A1* | 2/2019 | Sasaki | B62D 5/0421 |
| 2019/0211905 A1* | 7/2019 | Lin | F16H 25/2219 |
| 2020/0021221 A1* | 1/2020 | Polcuch | H02P 23/14 |
| 2021/0108709 A1* | 4/2021 | Leiber | F16D 65/16 |

* cited by examiner

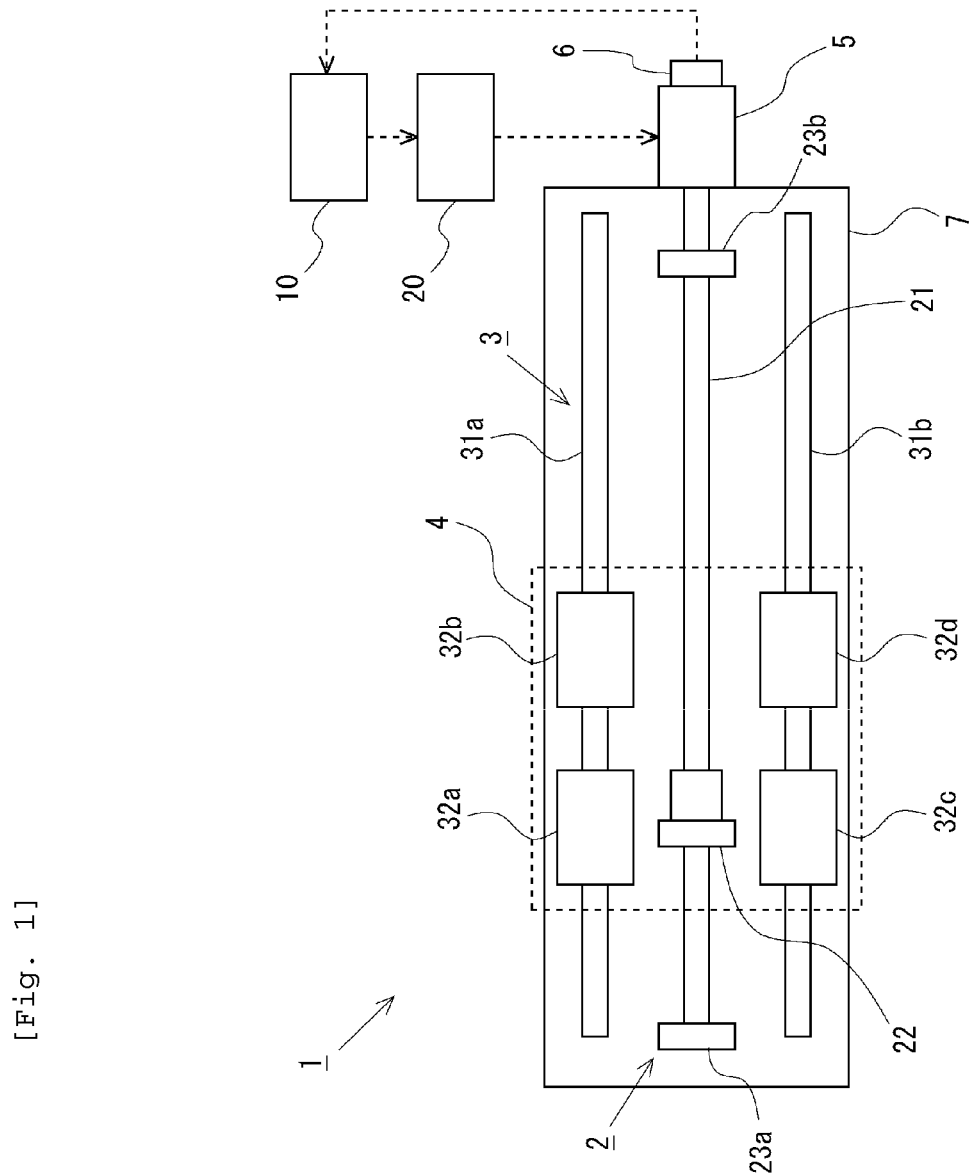
[Fig. 1]

[Fig. 2]
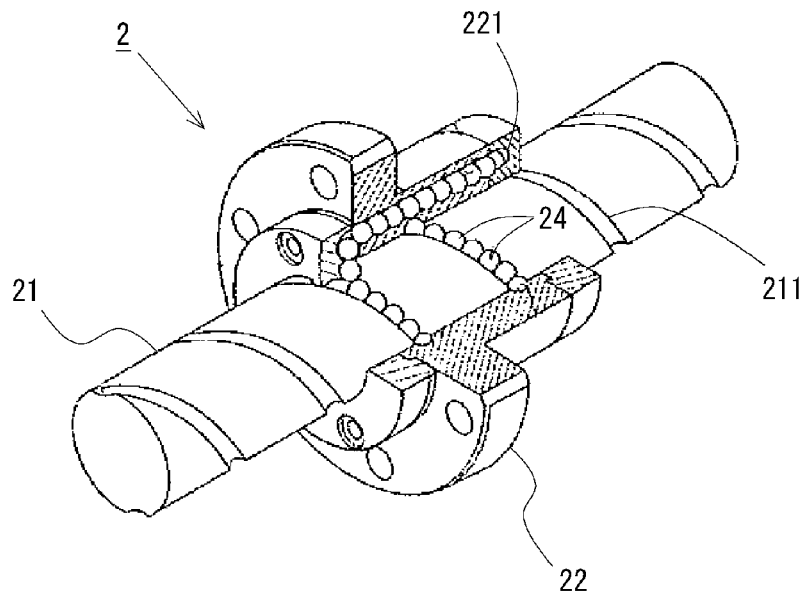
[Fig. 3]
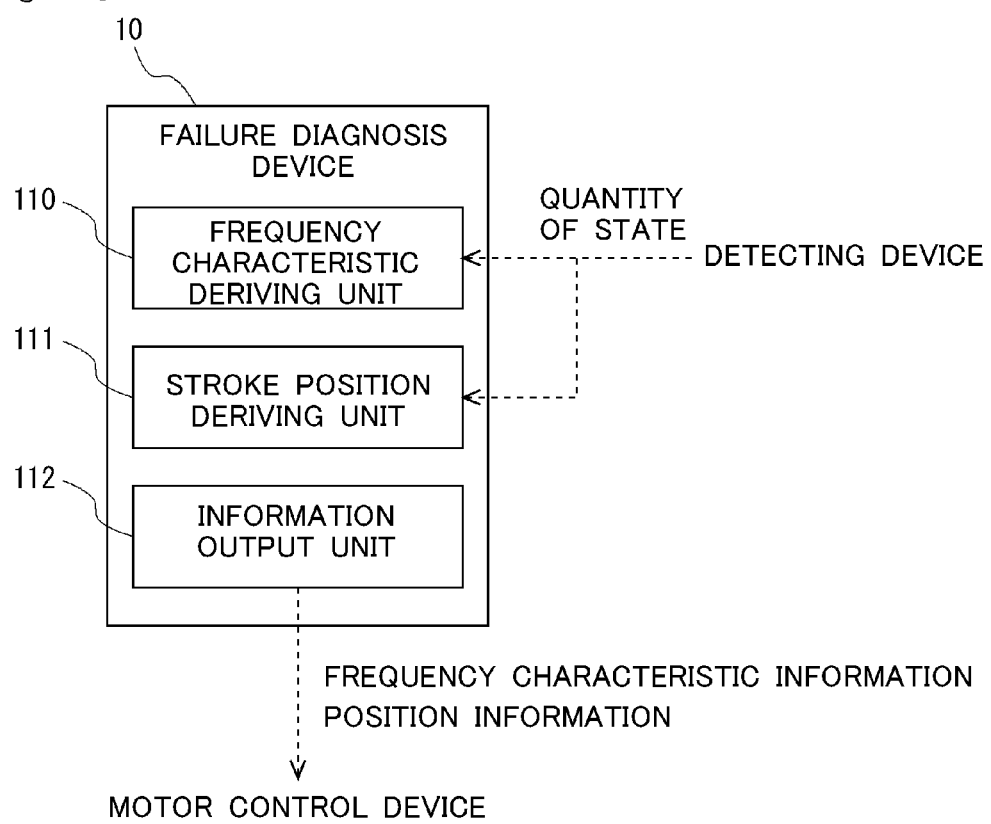

[Fig. 4]
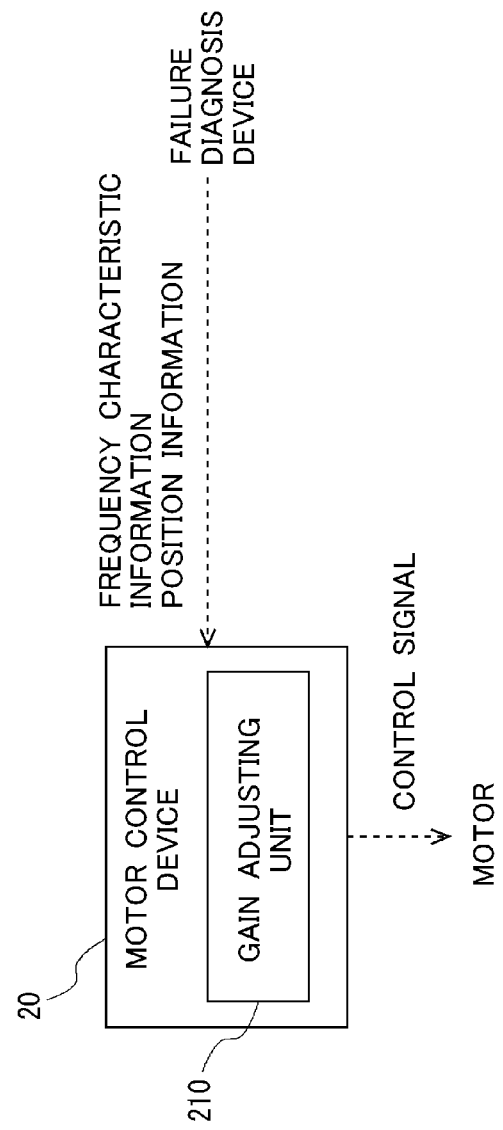

[Fig. 5]
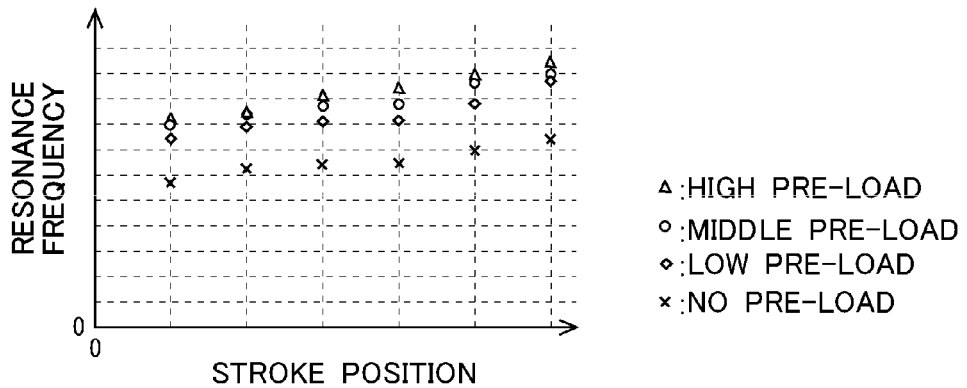
[Fig. 6]
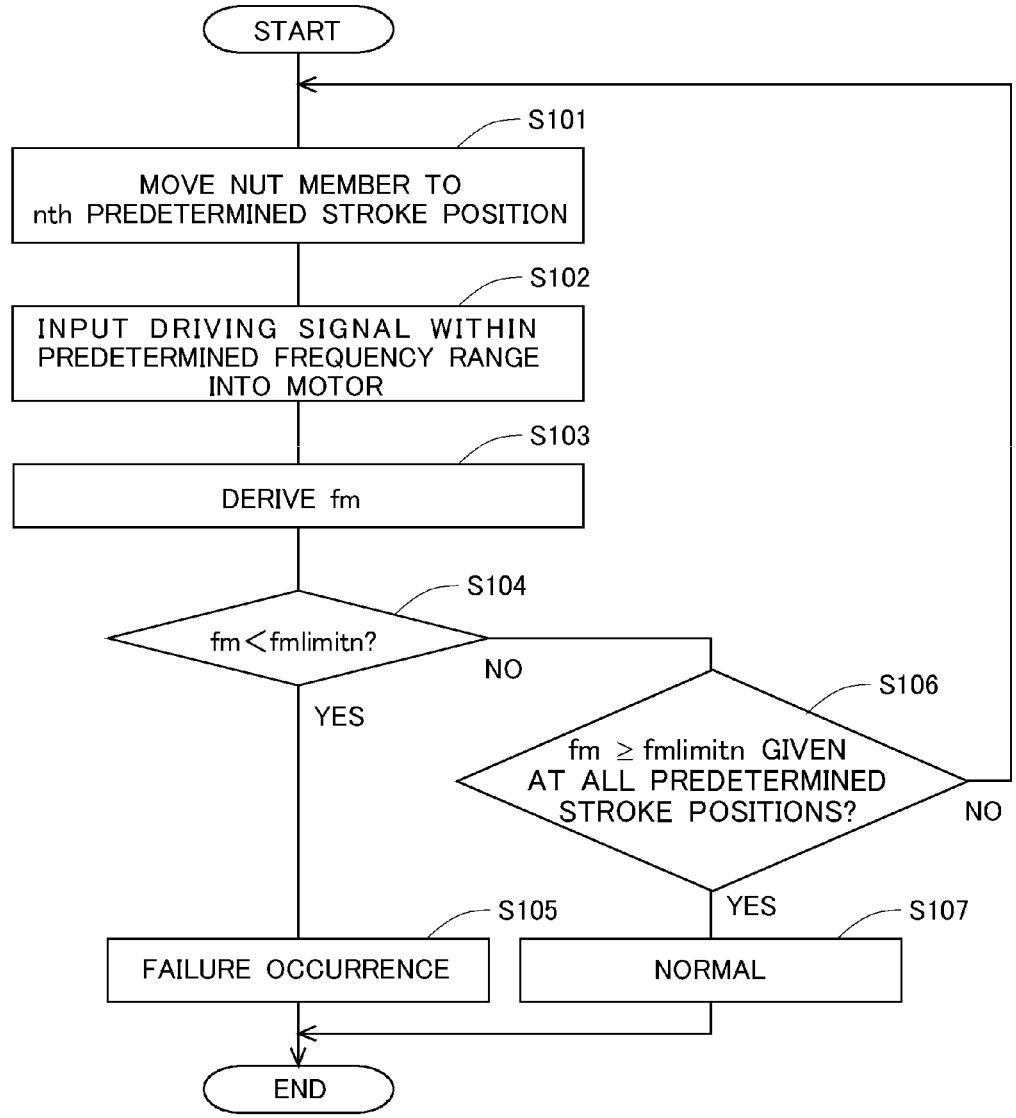

DIAGNOSIS SYSTEM FOR BALL SCREW UNIT AND MOTOR CONTROL SYSTEM

TECHNICAL FIELD

The present invention relates to a diagnosis system for a ball screw unit and a motor control system for controlling a motor which drives and rotates a screw shaft of the ball screw unit.

BACKGROUND ART

A ball screw unit is used in order to convey and position a workpiece in various apparatuses including, for example, machine tools, industrial robots, and semiconductor manufacturing equipments. The ball screw unit has a screw shaft and a nut member which is fitted to the screw shaft. The ball screw unit is configured such that a plurality of balls, which serve as rolling members, intervene between the screw shaft and the nut member, and thus the nut member is movable in the axial direction of the screw shaft. Then, the screw shaft is driven and rotated by a motor, and thus the nut member is moved with respect to the screw shaft. Accordingly, a table, which is attached to the nut member and which carries the workpiece placed thereon, has the position which is controlled to be a desired position. Patent Literature 1 discloses a technique which relates to a ball screw unit configured as described above. Further, Patent Literature 2 discloses a ball screw type driving apparatus which uses a ball screw unit configured as described above.

On the other hand, Patent Literature 3 discloses a technique which relates to a servomotor control apparatus that controls a servomotor for driving a machine tool. In the case of the technique described in Patent Literature 3, a resonance frequency is detected by inputting a sine wave external disturbance value into a speed control loop of the servomotor, and the mechanical rigidity of the machine tool is measured on the basis of the detected resonance frequency. Then, the inspection timing for the machine tool is notified on the basis of the measured mechanical rigidity.

PRIOR ART LITERATURES

Patent Literatures

Patent Literature 1: Japanese Patent Application Laid-Open No. 2010-149770
Patent Literature 2: Japanese Patent Application Laid-Open No. 2017-53431
Patent Literature 3: Japanese Patent Application Laid-Open No. 2016-34224

SUMMARY OF THE INVENTION

Problems to be Solved by the Invention

A ball rolling groove, in which the balls roll when the nut member is moved, is formed on the outer circumferential surface of the screw shaft of the ball screw unit. Further, a predetermined pre-load is applied in the ball screw unit in order to suppress the displacement amount of the nut member in the axial direction with respect to the external load. In this context, as for the ball rolling groove of the screw shaft, any abrasion and/or any breakage arise(s) in some cases on account of the secular or time-dependent change. If any abrasion and/or any breakage arise(s) on the ball rolling groove, any decrease in the pre-load is caused in some cases.

In this way, if any trouble or failure (fault), which causes the decrease in the pre-load, arises, the movement accuracy of the nut member with respect to the screw shaft is lowered. Therefore, it is feared that any harmful influence may be exerted on the position control for the table. The present invention has been made taking the foregoing problem into consideration, an object of which is to provide a technique that makes it possible to preferably detect the failure accompanied with the decrease in the pre-load in the ball screw unit.

Means for Solving the Problems

In order to solve the problem as described above, the present invention adopts such configuration that the failure diagnosis is performed for a ball screw unit on the basis of a combination of a resonance frequency in the axial direction of a predetermined machine assembly including a ball screw unit and a motor as obtained when a screw shaft is driven and rotated by the motor and a position of a nut member on the screw shaft corresponding to the resonance frequency.

In particular, according to the present invention, there is provided a failure diagnosis system for performing failure diagnosis for a ball screw unit including a screw shaft which has a ball rolling groove formed on an outer circumferential surface and a nut member which is fitted to the screw shaft in such a state that a plurality of balls to roll in the ball rolling groove intervene therebetween and which is movable in an axial direction of the screw shaft by driving and rotating the screw shaft; the failure diagnosis system for the ball screw unit comprising a motor which drives and rotates the screw shaft; a detecting device which detects a quantity of state in relation to a rotation state of the screw shaft; and a diagnosis device which performs the failure diagnosis for the ball screw unit; wherein the diagnosis device has a frequency characteristic deriving unit which derives a resonance frequency in the axial direction of a predetermined machine assembly configured to include the ball screw unit and the motor on the basis of the quantity of state in relation to the rotation state of the screw shaft detected by the detecting device when the screw shaft is driven and rotated by the motor; and the diagnosis device performs the failure diagnosis for the ball screw unit on the basis of a combination of the resonance frequency in the axial direction of the predetermined machine assembly derived by the frequency characteristic deriving unit and a stroke position of the nut member as a position of the nut member on the screw shaft corresponding to the derived resonance frequency.

In the failure diagnosis system according to the present invention, the quantity of state, which relates to the rotation state of the screw shaft when the screw shaft is driven and rotated by the motor, is detected by the detecting device. Then, the resonance frequency in the axial direction of the predetermined machine assembly configured to include the ball screw unit and the motor is derived by the frequency characteristic deriving unit of the diagnosis device on the basis of the quantity of state detected by the detecting device. In this context, the predetermined machine assembly is the aggregation of machine elements to be vibrated together with the ball screw unit and the motor when the screw shaft is driven and rotated by the motor. Further, the resonance frequency in the axial direction of the predetermined machine assembly is the resonance frequency in relation to the vibration in the axial direction of the screw shaft of the predetermined machine assembly.

In this context, if the pre-load is lowered on account of the occurrence of any abrasion and/or any breakage on the ball rolling groove of the screw shaft of the ball screw unit, the resonance frequency in the axial direction of the predetermined machine assembly, which is derived by the frequency characteristic deriving unit when the screw shaft is driven and rotated by the motor, exhibits the characteristic which is different from that obtained when the pre-load has a normal value. In other words, if the pre-load is lowered in the ball screw unit, the resonance frequency in the axial direction of the predetermined machine assembly is lowered.

However, even when the pre-load of the ball screw unit is constant, if the stroke position of the nut member, which is the position of the nut member on the screw shaft, differs, then the resonance frequency in the axial direction of the predetermined machine assembly differs. Further, the abrasion and/or the breakage of the ball rolling groove of the screw shaft of the ball screw unit occur(s) at only a partial portion of the screw shaft in some cases. In this situation, the decrease in the pre-load arises only when the nut member is positioned at the portion at which the abrasion and/or the breakage of the ball rolling groove of the screw shaft occur(s). As a result, the resonance frequency in the axial direction of the predetermined machine assembly is lowered as compared with that obtained in the normal state.

In view of the above, in the present invention, the diagnosis device performs the failure diagnosis for the ball screw unit by combining the stroke position of the nut member corresponding to the resonance frequency (i.e., the stroke position of the nut member obtained when the resonance frequency is derived), without being limited to the use of only the resonance frequency in the axial direction of the predetermined machine assembly derived by the frequency characteristic deriving unit. According to this feature, it is possible to highly accurately detect the trouble or failure (fault) accompanied with the decrease in the pre-load in the ball screw unit.

Advantageous Effect of the Invention

According to the present invention, it is possible to more preferably detect the trouble or failure (fault) accompanied with the decrease in the pre-load in the ball screw unit.

BRIEF DESCRIPTION OF THE DRAWINGS

FIG. 1 shows a schematic arrangement of a ball screw type driving system according to an embodiment.

FIG. 2 explains a schematic arrangement of a ball screw unit of the ball screw type driving system shown in FIG. 1.

FIG. 3 shows a block diagram illustrating functional units of a failure diagnosis device of the ball screw type driving system shown in FIG. 1.

FIG. 4 shows a block diagram illustrating functional units of a motor control device of the ball screw type driving system shown in FIG. 1.

FIG. 5 shows a correlation among the stroke position of a nut member, the resonance frequency in the axial direction of a predetermined machine assembly, and the pre-load of the ball screw unit, when a screw shaft is driven and rotated by a motor in the ball screw type driving system shown in FIG. 1.

FIG. 6 shows a flow chart illustrating a flow of the failure diagnosis for the ball screw unit according to the embodiment.

EMBODIMENTS FOR CARRYING OUT THE INVENTION

An explanation will be made below on the basis of the drawings about a specified embodiment of the present invention. For example, the dimension or size, the material, the shape, and the relative arrangement of each of constitutive parts or components described in the embodiment of the present invention are not intended to limit the technical scope of the invention only thereto unless specifically noted.

(Schematic Arrangement of System)

FIG. 1 shows a schematic arrangement of a ball screw type driving system according to an embodiment of the present invention. Further, FIG. 2 explains a schematic arrangement of a ball screw unit provided for the ball screw type driving system according to the embodiment of the present invention.

As shown in FIG. 1, the ball screw type driving system 1 according to the embodiment of the present invention is provided with a ball screw unit 2, a guiding device 3, a table 4, a motor 5, a detecting device 6, and a base member 7. Further, the ball screw unit 2 has a screw shaft 21, a nut member 22, and support bearings 23a, 23b.

As shown in FIG. 2, a ball rolling groove 211 is formed on the outer circumferential surface of the screw shaft 21 of the ball screw unit 2. Then, the nut member 22 is fitted to the screw shaft 21 in a state in which a plurality of balls 24, which roll in the ball rolling groove 211, intervene therebetween. Further, a ball return passage 221, which extends in the axial direction of the screw shaft 21, is formed at the inside of the nut member 22. When the nut member 22 is moved in the axial direction of the screw shaft 21, then the balls 24 are fed into one end side of the ball return passage 221 from the ball rolling groove 211, and the balls 24 are fed to the ball rolling groove 211 from the other end side of the ball return passage 221. In other words, an endless circulation passage, along which the balls 24 circulate, is formed by the ball rolling groove 211 which is formed on the screw shaft 21 and the ball return passage 221 which is formed on the nut member 22. Then, when the nut member 22 is moved in the axial direction of the screw shaft 21, the plurality of balls 24 circulate in the endless circulation passage. Note that FIG. 2 is depicted in a state in which a part of the nut member 22 is cut out in order to explain the internal structure of the nut member 22. Further, as shown in FIG. 1, the screw shaft 21 is rotatably supported by the pair of support bearings 23a, 23b in the ball screw unit 2. Note that the respective support bearings 23a, 23b are fixed to the base member 7.

The table 4, which is provided to place a workpiece thereon, is attached to the nut member 22 of the ball screw unit 2. Therefore, when the nut member 22 is moved in the axial direction of the screw shaft 21, the table 4 is also moved in accordance therewith. Further, the guiding device 3 is the device which is provided to guide the movement of the table 4 in accordance with the movement of the nut member 22 in the axial direction of the screw shaft 21 while supporting the table 4. The guiding device 3 has two rails 31a, 31b and four blocks 32a, 32b, 32c, 32d. The two rails 31a, 31b extend in the axial direction of the screw shaft 21 respectively, and the two rails 31a, 31b are fixed to the base member 7 so that the two rails 31a, 31b are parallel to one another while interposing the screw shaft 21. Then, the blocks 32a, 32b are attached to one rail 31a in a state in which a plurality of balls (not shown) to serve as rolling members intervene therebetween. Further, the blocks 32c, 32d are attached to the other rail 31b in a state in which a plurality of balls (not shown) to serve as rolling members intervene therebetween. Accordingly, the guiding device 3 is configured so that the blocks 32a, 32b are movable in the axial direction of the rail 31a, and the blocks 32c, 32d are movable in the axial direction of the rail 31b. Then, the table 4 is fixed to the respective blocks 32a, 32b, 32c, 32d. Accordingly, when the table 4 is moved in accordance with the movement of the nut member 22 in the axial direction of the screw shaft 21, then the blocks 32a, 32b, 32c, 32d are moved in the axial direction of the rails 31a, 31b, and thus the movement of the table 4 is guided.

Further, in the ball screw type driving system 1, one end portion of the screw shaft 21 is connected via a coupling member to the rotating shaft of the motor 5. The screw shaft 21 is driven and rotated by the motor 5. Then, the nut member 22 is moved in the axial direction of the screw shaft 21 by driving and rotating the screw shaft 21. Further, the motor 5 is provided with the detecting device 6 such as an encoder or the like which detects the quantity of state (for example, the rotation position and the rotation speed of the screw shaft 21) in relation to the rotation state of the screw shaft 21.

Further, the ball screw type driving system 1 according to the embodiment of the present invention is provided with a failure diagnosis device 10 which performs the failure diagnosis for the ball screw unit and a motor control device 20 which controls the driving of the motor 5. FIG. 3 shows a block diagram illustrating functional units of the failure diagnosis device 10. As shown in FIG. 3, the failure diagnosis device 10 has a frequency characteristic deriving unit 110, a stroke position deriving unit 111, and an information output unit 112. Further, FIG. 4 shows a block diagram illustrating functional units of the motor control device 20. As shown in FIG. 4, the motor control device 20 has a gain adjusting unit 210. Note that details will be described later on about the functions of the respective functional units of the failure diagnosis device 10 and the motor control device 20.

(Trouble Diagnosis)

Next, an explanation will be made about the failure diagnosis for the ball screw unit according to the embodiment of the present invention. In the ball screw unit 2, the predetermined pre-load is applied in order to suppress the displacement amount in the axial direction of the nut member 22 with respect to the external load. Note that as for the system for applying the pre-load in the ball screw unit 2, it is allowable to adopt any well-known system. Further, the value of the predetermined pre-load applied to the ball screw unit 2 is set to be an appropriate value on the basis of, for example, an experiment. In the ball screw unit 2, the gap between the balls 24 and the screw groove formed by the ball rolling groove 211 is approximately zero owing to the pre-load applied as described above. Therefore, it is possible to suppress the displacement amount in the axial direction of the nut member 22 with respect to the external load. As a result, it is possible to improve the rigidity in the axial direction of the ball screw unit 2, and thus it is possible to improve the movement accuracy of the nut member 22 with respect to the screw shaft 21.

However, any abrasion and/or any breakage occurs(s) in some cases due to, for example, the secular or time-dependent deterioration in relation to the ball rolling groove 211 of the screw shaft 21. Then, if any abrasion and/or any breakage occurs(s) on the ball rolling groove 211, the decrease in the pre-load is caused in some cases. In this way, if any failure, which causes the decrease in the pre-load, arises in the ball screw unit 2, then the rigidity in the axial direction is lowered, and thus the movement accuracy of the nut member 22 with respect to the screw shaft 21 is lowered. As a result, it is feared that any harmful influence may be exerted on the position control of the table 4 when the workpiece is conveyed and positioned. In view of the above, in the embodiment of the present invention, the failure diagnosis is performed in order to detect the failure accompanied with the decrease in the pre-load in the ball screw unit 2.

In the ball screw type driving system 1 according to the embodiment of the present invention, when the screw shaft 21 is driven and rotated by the motor 5, the mechanical elements, which include, for example, the guiding device 3 and the table 4, are vibrated together with the ball screw unit 2 and the motor 5. In the following description, the aggregation of the mechanical elements of the ball screw unit 2 and the motor 5 as well as the guiding device 3 and the table 4 which are vibrated together therewith in the ball screw type driving system 1 is referred to as "predetermined machine assembly". Further, in the embodiment of the present invention, the detecting device 6 can be used to detect the change in the actual quantity of state of the screw shaft 21 when the nut member 22 is moved in the axial direction of the screw shaft 21 by driving and rotating the screw shaft 21 by the motor 5. Then, it is possible to derive the resonance frequency in the axial direction of the predetermined machine assembly on the basis of the change in the actual quantity of state of the screw shaft 21 detected in this situation.

An explanation will now be made on the basis of FIG. 5 about the correlation among the stroke position of the nut member 22, the resonance frequency in the axial direction of the predetermined machine assembly, and the pre-load of the ball screw unit 2 when the screw shaft 21 is driven and rotated by the motor 5 in the ball screw type driving system 1. The horizontal axis of FIG. 5 represents the stroke position of the nut member 22, i.e., the position of the nut member 22 on the screw shaft 21. In this case, it is assumed that the stroke position of the nut member 22 is the relative position of the nut member 22 with respect to the support bearing 23a shown in FIG. 1 (i.e., the support bearing positioned on the side opposite to the side of the motor 5). However, in the present invention, the stroke position of the nut member is not limited to the position of the nut member on the basis of the support bearing of the screw shaft. Further, the vertical axis of FIG. 5 represents the resonance frequency in the axial direction of the predetermined machine assembly. Further, in FIG. 5, the x-marks (X), the rhombus marks (◇), the balloon marks (○), and the triangle marks (Δ) are used to plot the correlations between the stroke position of the nut member 22 and the resonance frequency in the axial direction of the predetermined machine assembly when the pre-load of the ball screw unit 2 is intentionally set to have different values respectively. In this case, the x-marks indicate the correlation obtained when no pre-load is applied in the ball screw unit 2. Further, the rhombus marks indicate the correlation obtained when the relatively low pre-load is applied in the ball screw unit 2. Further, the triangle marks indicate the correlation obtained when the relatively high pre-load is applied in the ball screw unit 2. Further, the balloon marks indicate the correlation obtained when the low pre-load, which is higher than that applied when the correlation is indicated by the rhombus marks and which is lower than that applied when the correlation is indicated by the triangle marks, is applied in the ball screw unit 2.

As shown in FIG. 5, if the stroke position of the nut member 22 is identical, there is such a tendency that the higher the pre-load of the ball screw unit 2 is, the higher the resonance frequency in the axial direction of the predetermined machine assembly is, for the following reason. That is, the higher the pre-load of the ball screw unit 2 is, the higher the rigidity in the axial direction of the ball screw unit 2 is. Taking such a tendency into consideration, it is considered that the resonance frequency in the axial direction of the predetermined machine assembly is lowered when the failure, which is accompanied with the decrease in the pre-load, is caused in the ball screw unit 2, as compared with when the ball screw unit 2 is in the normal state. Therefore, it is possible to detect the failure accompanied with the decrease in the pre-load in the ball screw unit 2 on the basis of the resonance frequency in the axial direction of the predetermined machine assembly.

However, as shown in FIG. 5, in the case of the ball screw unit 2, even when the pre-load is constant, the resonance frequency in the axial direction of the predetermined machine assembly differs depending on the stroke position of the nut member 22. Further, the abrasion and/or the breakage of the ball rolling groove 211 of the screw shaft 21 of the ball screw unit 2 is/are caused at only a partial portion of the screw shaft 21. In this case, the decrease in the pre-load occurs only when the nut member 22 is positioned at the portion at which the abrasion and/or the breakage of the ball rolling groove 211 of the screw shaft 21 is/are caused. In other words, the resonance frequency in the axial direction of the predetermined machine assembly is lowered as compared with that obtained in the normal state, only when the stroke position of the nut member 22 is the specified position.

In view of the above, in the embodiment of the present invention, the failure diagnosis is performed for the ball screw unit 2 on the basis of the combination of the resonance frequency in the axial direction of the predetermined machine assembly and the stroke position of the nut member 22 obtained when the resonance frequency is derived, when the screw shaft 21 is driven and rotated by the motor 5. FIG. 6 shows a flow chart illustrating a flow of the failure diagnosis for the ball screw unit according to the embodiment of the present invention. This flow is realized by executing a predetermined program stored in the failure diagnosis device 10 when the failure diagnosis is performed for the ball screw unit 2. Further, the control of the motor 5 is executed by the motor control device 20 in order to drive and rotate the screw shaft 21 in this flow.

As described above, the abrasion and/or the breakage of the ball rolling groove 211 of the screw shaft 21 of the ball screw unit 2 is caused at only the partial portion of the screw shaft 21 in some cases. On this account, in the embodiment of the present invention, a plurality of predetermined stroke positions are previously set as the stroke positions on the screw shaft 21 on which the nut member 22 is arranged when the failure diagnosis is performed for the ball screw unit 2. Then, the nut member 22 is successively moved to each of the predetermined stroke positions to execute the process for the failure diagnosis at each of the predetermined stroke positions. Note that in the following description, if the respective predetermined stroke positions are described while being distinguished from each other, each of the predetermined stroke positions is described as "nth predetermined stroke position" (n=1, 2, 3, . . . ).

In the flow shown in FIG. 6, at first, in S101, the nut member 22 is moved to the nth predetermined stroke position at which the process is to be executed in order to perform the failure diagnosis by driving and rotating the screw shaft 21 by the motor 5. Note that in the embodiment of the present invention, the failure diagnosis device 10 has the stroke position deriving unit 111. The quantity of state, which relates to the rotation state of the screw shaft 21, is inputted from the detecting device 6 into the stroke position deriving unit 111. Then, the stroke position deriving unit 111 derives the stroke position of the nut member 22 on the basis of the inputted quantity of state which relates to the rotation state of the screw shaft 21. In S101, the screw shaft 21 is driven and rotated by the motor 5 until the stroke position of the nut member 22, which is derived by the stroke position deriving unit 111, arrives at the nth predetermined stroke position.

Subsequently, in S102, the driving signal (control signal), which is within a predetermined frequency range, is inputted into the motor 5 from the motor control device 20 in a state in which the nut member 22 is arranged at the nth predetermined stroke position. In other words, the driving signal for the motor 5 is swept within the predetermined frequency range to drive the screw shaft 21. In this procedure, the predetermined frequency range is the range in which it is assumed that the resonance occurs in the predetermined machine assembly at the frequency within the predetermined frequency range, and the predetermined frequency range is previously decided on the basis of, for example, an experiment.

Subsequently, in S103, the resonance frequency fm in the axial direction of the predetermined machine assembly is derived by the frequency characteristic deriving unit 110 of the failure diagnosis device 10. In particular, the quantity of state, which relates to the rotation state of the screw shaft 21, is inputted from the detecting device 6 into the frequency characteristic deriving unit 110. Accordingly, when the driving signal (control signal) for the motor 5 is swept within the predetermined frequency range in S102, the frequency characteristic deriving unit 110 derives the vibration frequency in the axial direction of the predetermined machine assembly on the basis of the change in the quantity of state of the screw shaft 21. Then, in S103, the frequency characteristic deriving unit 110 derives the resonance frequency fm on the basis of the vibration frequency in the axial direction of the predetermined machine assembly derived during the period in which the driving signal (control signal) for the motor 5 is swept.

Subsequently, in S104, it is judged whether or not the resonance frequency fm in the axial direction of the predetermined machine assembly, which is derived in S103, is lower than the nth threshold frequency fmlimitn which is decided depending on the nth predetermined stroke position. In this procedure, the threshold frequency is the lower limit value of the resonance frequency fm in the axial direction of the predetermined machine assembly with which it is possible to judge that the predetermined pre-load is applied to the ball screw unit 2. Further, as described above, even when the predetermined pre-load is applied to the ball screw unit 2, the resonance frequency fm in the axial direction of the predetermined machine assembly changes depending on the stroke position of the nut member 22. On this account, the threshold frequency, which corresponds to each of the predetermined stroke positions, is previously decided on the basis of, for example, an experiment. Then, in the embodiment of the present invention, the threshold frequency, which corresponds to the nth predetermined stroke position, is designated as the nth threshold frequency fmlimitn.

If the affirmative judgment is made in S104, it is possible to judge that the pre-load of the ball screw unit 2 is lowered as compared with the predetermined pre-load. On this account, in this case, it is subsequently judged in S105 that the failure, which accompanies the decrease in the pre-load, is caused in the ball screw unit 2. In this case, the failure diagnosis device 10 stores the resonance frequency in the axial direction of the predetermined machine assembly provided in this situation and the stroke position (any one of the plurality of predetermined stroke positions) of the nut member 22 provided when the resonance frequency is derived.

On the other hand, if the negative judgment is made in S104, it is possible to judge that the failure (abrasion and/or breakage of the screw shaft 21), which accompanies the decrease in the pre-load, is not caused at the predetermined stroke position dealt with at this time. In this case, the process of S106 is subsequently executed. In S106, it is judged, at all of the predetermined stroke positions, whether or not the resonance frequency fm in the axial direction of the predetermined machine assembly is judged to be not less than the threshold frequency fmlimitn corresponding to each of the predetermined stroke positions. In other words, it is distinguished whether or not the processes ranging from S102 to S104 are executed in the states in which the nut member 22 is arranged at all of the predetermined stroke positions and the negative judgment is made in S104 in relation to all of the cases. If the affirmative judgment is made in S106, it is possible to judge that the failure, which accompanies the decrease in the pre-load, is not caused at all of the predetermined stroke positions. In this case, it is subsequently judged in S107 that the ball screw unit 2 is normal. On the other hand, if the negative judgment is made in S106, it is possible to judge that the failure diagnosis is not completed at all of the predetermined stroke positions. In other words, it is necessary to distinguish whether or not the failure, which accompanies the decrease in the pre-load, is caused at any predetermined stroke position which is different from the predetermined stroke position dealt with at this time. Accordingly, in this case, this flow is executed again from S101. In this case, in S101, the nut member 22 is moved to the predetermined stroke position at which the process for the failure diagnosis is to be executed next time.

As explained above, in the embodiment of the present invention, the failure diagnosis is performed for the ball screw unit 2 while considering not only the resonance frequency of the predetermined machine assembly obtained when the screw shaft 21 is driven and rotated but also the stroke position of the nut member 22 obtained when the resonance frequency is derived. Therefore, it is possible to highly accurately detect the failure accompanied with the decrease in the pre-load in the ball screw unit 2.

Further, in the embodiment of the present invention, it is distinguished whether or not the resonance frequency in the axial direction of the predetermined machine assembly is lower than the threshold frequency which is decided depending on each of the predetermined stroke positions, in relation to the plurality of predetermined stroke positions. Therefore, when the failure, which accompanies the decrease in the pre-load in the ball screw unit 2, is caused, it is possible to specify the failure occurrence position on the screw shaft 21.

However, it is not necessarily indispensable to distinguish whether or not the resonance frequency in the axial direction of the predetermined machine assembly is lower than the threshold frequency in relation to the plurality of predetermined stroke positions. For example, the portion, at which the abrasion and/or the breakage relatively tend(s) to occur on the screw shaft 21, may be previously specified on the basis of, for example, an experiment and/or a situation of use of the ball screw type driving system 1. The specified one portion may be set as the predetermined stroke position. However, even in this case, the threshold frequency, which is to be compared with the resonance frequency in the axial direction of the predetermined machine assembly at the predetermined stroke position, is decided depending on the predetermined stroke position. Also in this case, it is possible to highly accurately detect the failure which accompanies the decrease in the pre-load in the ball screw unit 2.

(Motor Control)

Next, an explanation will be made about the motor control to be performed after such a situation that the failure, which accompanies the decrease in the pre-load in the ball screw unit 2, is detected by carrying out the failure diagnosis as described above. If it is judged by the failure diagnosis described above that the failure, which accompanies the decrease in the pre-load in the ball screw unit 2, is caused, the failure diagnosis device 10 outputs the information relevant to the failure from the information output unit 112 to the motor control device 20. The information relevant to the failure, which is referred to herein, means the frequency characteristic information in relation to the resonance frequency in the axial direction of the predetermined machine assembly provided when the failure is detected and the position information in relation to the stroke position of the nut member 22 provided when the failure is detected.

In this case, the motor control device 20 has the gain adjusting unit 210 which adjusts the control gain of the control signal to be applied to the motor 5. Accordingly, in the embodiment of the present invention, if the information relevant to the failure as described above (frequency characteristic information and position information) is outputted from the information output unit 112 of the failure diagnosis device 10 to the motor control device 20, the control gain of the control signal to be applied to the motor 5 when the position control of the table 4 is executed after the execution of the failure diagnosis is adjusted by the gain adjusting unit 210 on the basis of the information as described above. Specifically, the gain adjusting unit 210 lowers the control gain of the control signal to be applied to the motor 5 as compared with that to be applied in the normal situation, on the basis of the frequency characteristic information and the position information. Accordingly, if the failure, which accompanies the decrease in the pre-load, occurs in the ball screw unit 2, it is possible to suppress the decrease in the accuracy of the position control of the table 4. Note that the motor control device 20 can also grasp the failure occurrence position on the screw shaft 21. Therefore, it is also allowable that only the control gain, which is provided when the nut member 22 is positioned at the failure occurrence position on the screw shaft 21, is lowered by the gain adjusting unit 210 as compared with that provided in the normal situation, during the execution of the position control of the table 4.

Further, if it is judged that the failure, which accompanies the decrease in the pre-load, occurs in the ball screw unit 2, the failure diagnosis device 10 may output the frequency characteristic information and the position information relevant to the failure to any external device which is not included in the ball screw type driving system 1, by means of the information output unit 112. In this case, as for the external device, it is possible to exemplify an information processing apparatus which aggregates information in relation to the states of respective systems when a plurality of ball screw type driving systems 1 are controlled.

DESCRIPTION OF THE REFERENCE SIGNS

1: ball screw type driving system, 2: ball screw unit, 21: screw shaft, 211: ball rolling groove, 22: nut member, 222:

ball return passage, 23*a*, 23*b*: support bearing, 24: ball, 4: table, 5: motor, 6: detecting device, 10: failure diagnosis device, 20: motor control device.

The invention claimed is:

1. A failure diagnosis system for performing failure diagnosis for a ball screw unit including a screw shaft which has a ball rolling groove formed on an outer circumferential surface and a nut member which is fitted to the screw shaft in such a state that a plurality of balls to roll in the ball rolling groove intervene therebetween and which is movable in an axial direction of the screw shaft by driving and rotating the screw shaft, the failure diagnosis system for the ball screw unit comprising:
 a motor configured to drive and rotate the screw shaft;
 a detecting device configured to detect a quantity of state in relation to a rotation state of the screw shaft; and
 a diagnosis device configured to perform the failure diagnosis for the ball screw unit, wherein:
 the diagnosis device has a frequency characteristic deriving unit configured to derive a resonance frequency in the axial direction of a predetermined machine assembly configured to include the ball screw unit and the motor on the basis of the quantity of state in relation to the rotation state of the screw shaft detected by the detecting device when the screw shaft is driven and rotated by the motor; and
 the diagnosis device performs the failure diagnosis for the ball screw unit on the basis of a combination of the resonance frequency in the axial direction of the predetermined machine assembly derived by the frequency characteristic deriving unit and a stroke position of the nut member as a position of the nut member on the screw shaft corresponding to the derived resonance frequency.

2. The failure diagnosis system for the ball screw unit according to claim 1, wherein the diagnosis device performs the failure diagnosis for the ball screw unit on the basis of whether or not the resonance frequency in the axial direction of the predetermined machine assembly derived by the frequency characteristic deriving unit is lower than a threshold frequency as decided depending on the stroke position of the nut member when the resonance frequency is derived.

3. The failure diagnosis system for the ball screw unit according to claim 1, wherein:
 the resonance frequencies in the axial direction of the predetermined machine assembly, which are provided when the stroke positions of the nut member are different from each other in the ball screw unit, are derived by the frequency characteristic deriving unit respectively; and
 the diagnosis device specifies a failure occurrence position on the screw shaft on the basis of the combination of each of the stroke positions of the nut member and each of the resonance frequencies in the axial direction of the predetermined machine assembly corresponding thereto.

4. The failure diagnosis system for the ball screw unit according to claim 1, wherein the diagnosis device further includes an information output unit configured to, when it is diagnosed that any failure occurs in the ball screw unit, output frequency characteristic information in relation to the resonance frequency in the axial direction of the predetermined machine assembly and the position information in relation to the stroke position of the nut member, as obtained in that situation, to a motor control device or an external device for applying a control signal to the motor.

5. A motor control system comprising:
 the failure diagnosis system for the ball screw unit as defined in claim 4; and
 the motor control device, wherein:
 if the diagnosis device diagnoses in the failure diagnosis system that any failure occurs in the ball screw unit, the information output unit outputs the frequency characteristic information and the position information as obtained in that situation to the motor control device; and
 the motor control device has a gain adjusting unit configured to adjust a control gain in the control signal applied to the motor on the basis of the frequency characteristic information and the position information outputted from the information output unit, when position control is executed for a table attached to the nut member after the failure diagnosis is carried out for the ball screw unit by the failure diagnosis system.

* * * * *